Figure 1:
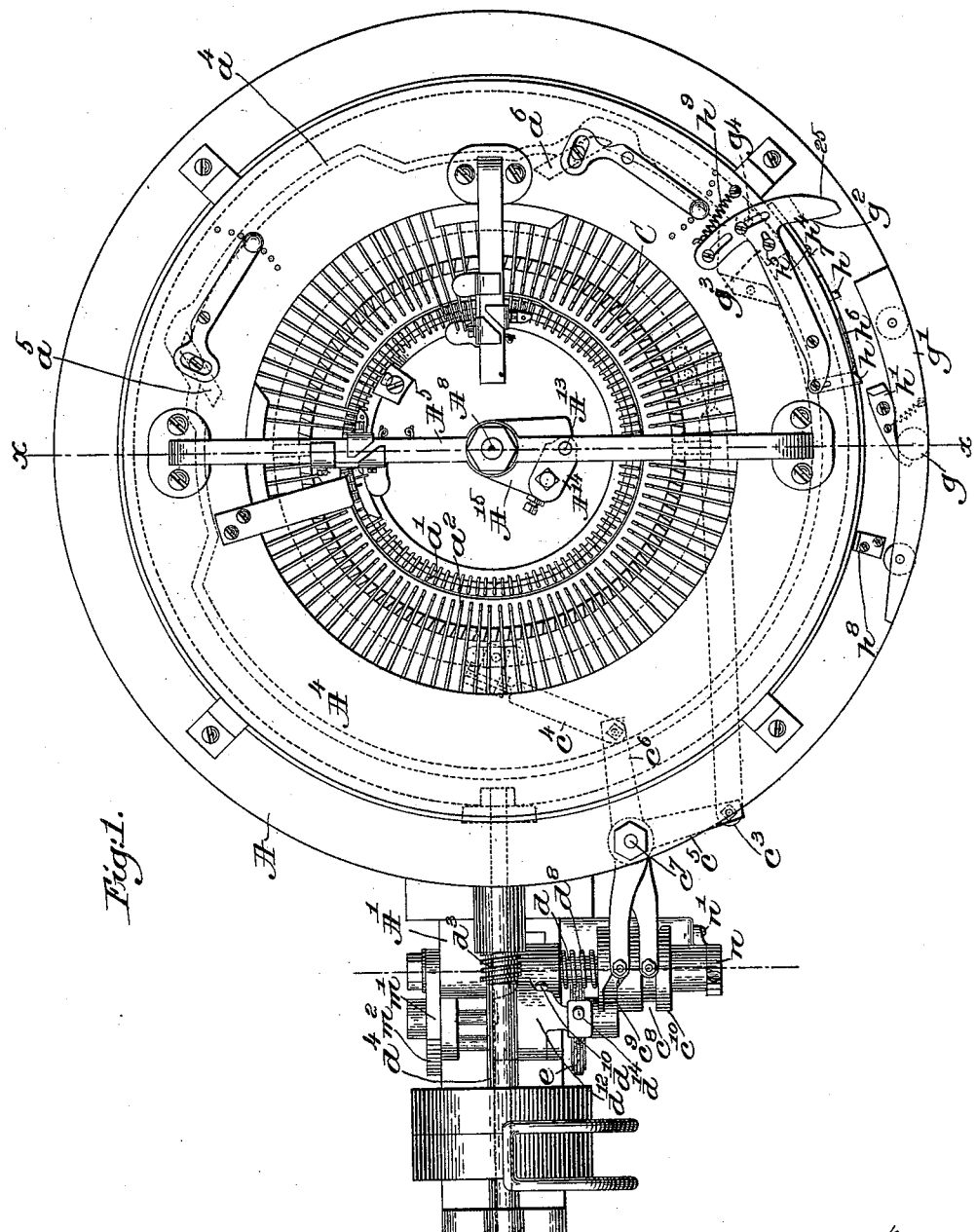

(No Model.) 5 Sheets—Sheet 1.

G. A. LEIGHTON & J. H. RICE.
KNITTING MACHINE.

No. 596,301. Patented Dec. 28, 1897.

Witnesses:
Fred S. Greenleaf.
Thomas F. Drummond.

Inventors,
George A. Leighton.
John H. Rice.
by Crosby Gregory attys.

(No Model.) 5 Sheets—Sheet 2.
G. A. LEIGHTON & J. H. RICE.
KNITTING MACHINE.
No. 596,301. Patented Dec. 28, 1897.
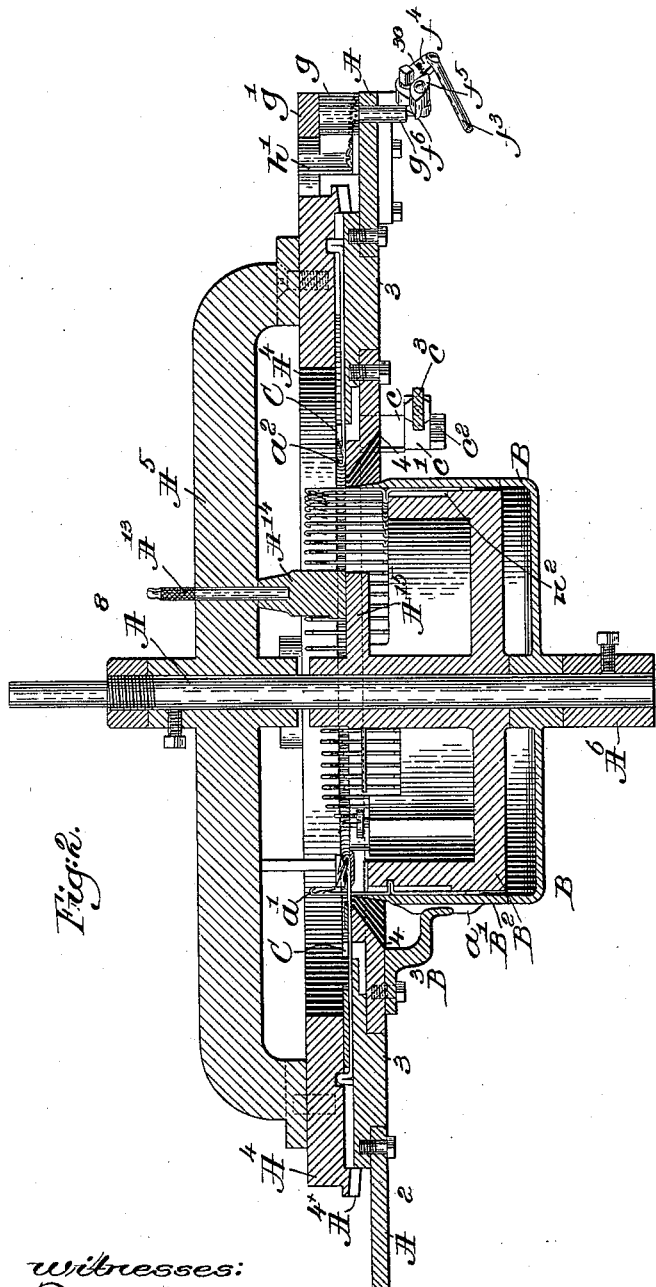
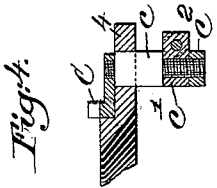
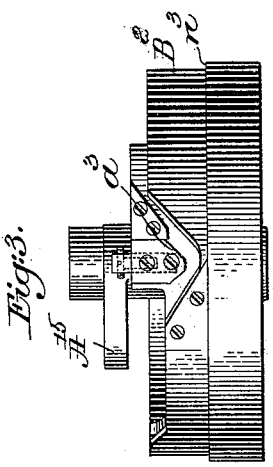
Witnesses:
Fred S. Greenleaf
Thomas J. Drummond
Inventors
George A. Leighton
John H. Rice
By Crosby Gregory
Attys.

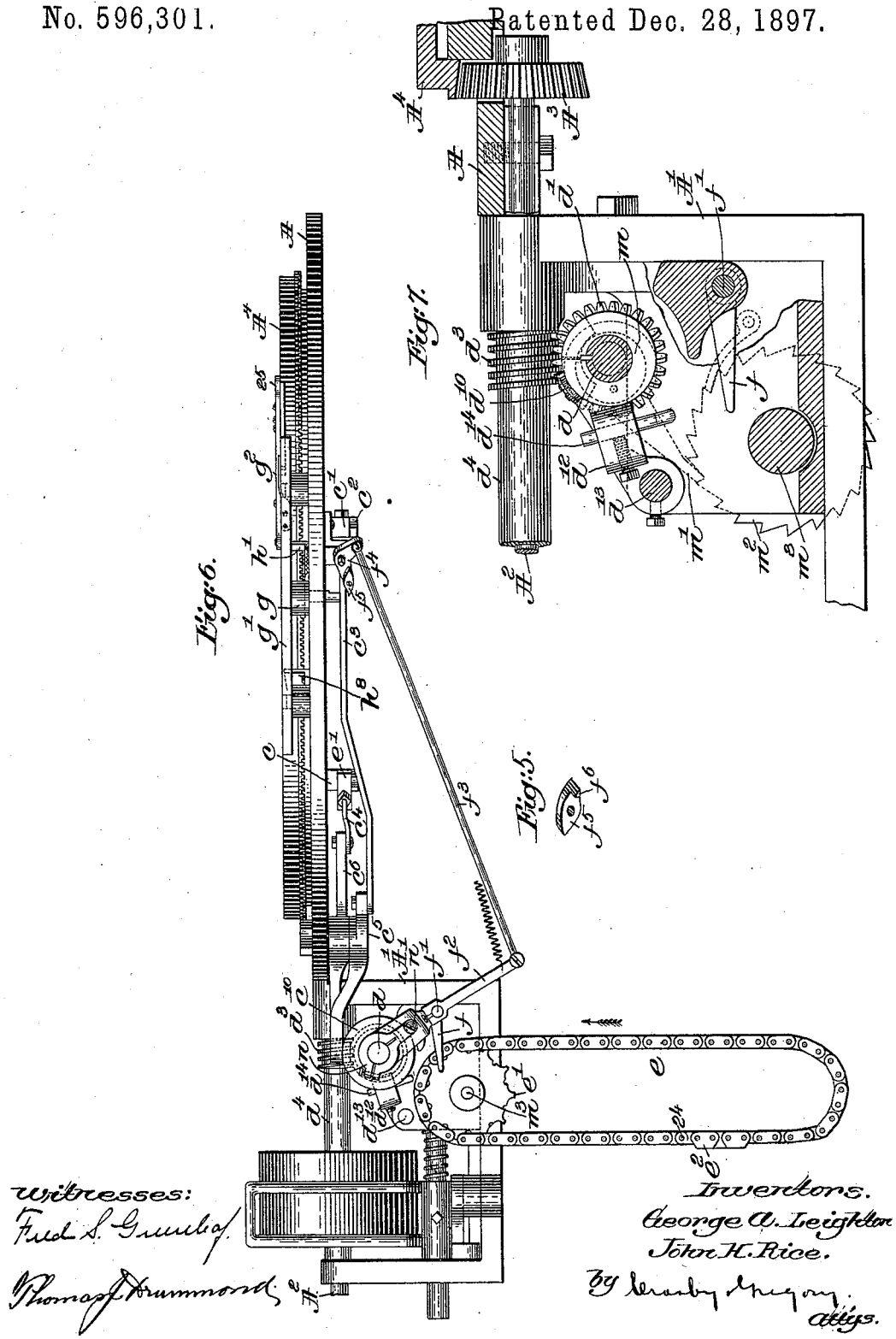

(No Model.) 5 Sheets—Sheet 4.
G. A. LEIGHTON & J. H. RICE.
KNITTING MACHINE.
No. 596,301. Patented Dec. 28, 1897.
Fig. 8.
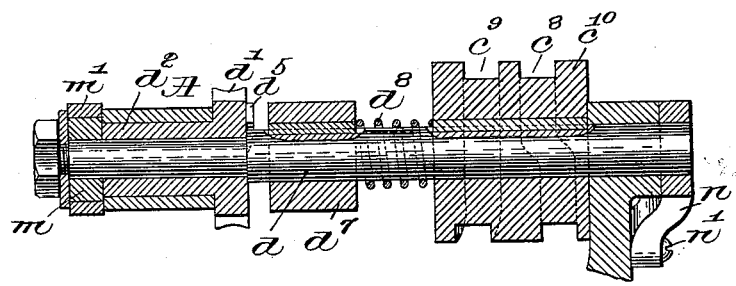
Fig. 9. Fig. 10.
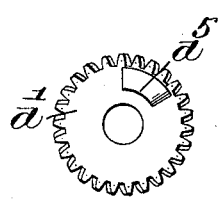 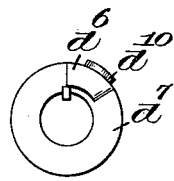
Fig. 11.
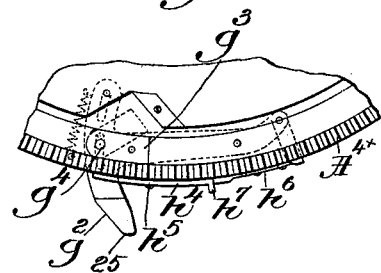
Witnesses:
Fred S. Greenleaf.
Thomas J. Drummond.
Inventors.
George A. Leighton
John H. Rice.
by Crosby & Gregory attys.

(No Model.) 5 Sheets—Sheet 5.

G. A. LEIGHTON & J. H. RICE.
KNITTING MACHINE.

No. 596,301. Patented Dec. 28, 1897.

Witnesses:
Fred L. Greenleaf
Thomas J. Drummond

Inventors.
George A. Leighton,
John H. Rice.
by Crosby & Gregory
attys.

UNITED STATES PATENT OFFICE.

GEORGE A. LEIGHTON AND JOHN H. RICE, OF MANCHESTER, NEW HAMPSHIRE.

KNITTING-MACHINE.

SPECIFICATION forming part of Letters Patent No. 596,301, dated December 28, 1897.

Application filed December 14, 1896. Serial No. 615,675. (No model.)

*To all whom it may concern:*

Be it known that we, GEORGE A. LEIGHTON and JOHN H. RICE, of Manchester, county of Hillsborough, State of New Hampshire, have invented an Improvement in Knitting-Machines, of which the following description, in connection with the accompanying drawings, is a specification, like letters and figures on the drawings representing like parts.

This invention has for its object the production of an improved knitting-machine wherein the dial-needles may be racked at will to provide for changes in the knitting-stitch.

In machines now made the dial-needle bed containing the dial-needles has been divided into sections, and one of said sections with its needles has been partially rotated with relation to the other section and its needles; but in this present invention the usual dial-needle bed is provided with a circularly-movable dial-needle-racking guide, said guide being composed of segmental notched bars, the forward ends of the needles entering said notches, the movement of the segments, which may be controlled by a suitable pattern surface or mechanism, springing or deflecting the said needles a little back of their hooked ends, putting them a little to one side of their true radial positions, so that said needles may for some stitches pass certain of the cylinder-needles at one side and for other stitches pass the same needles at the other side and remain in either of their two or changed conditions to knit any desired number of courses, according to the work to be done.

The machine also contains novel devices under the control of a pattern-surface to impart to a throwing-in cam of the dial-plate a determined inward movement when racking-stitches are to be made, to thus pass said dial-needles far enough through the loops on their shanks to put said loops behind the latches of said needles to enable the loops to be cast off from them, as will be described.

Figure 12:
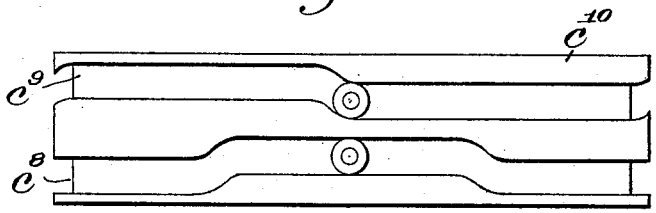
Figure 13:
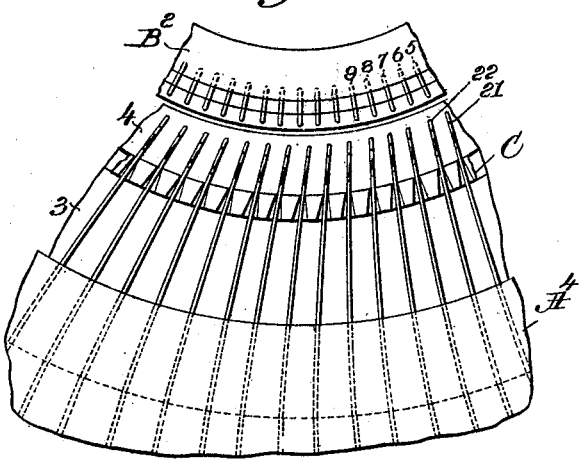
Figure 14:
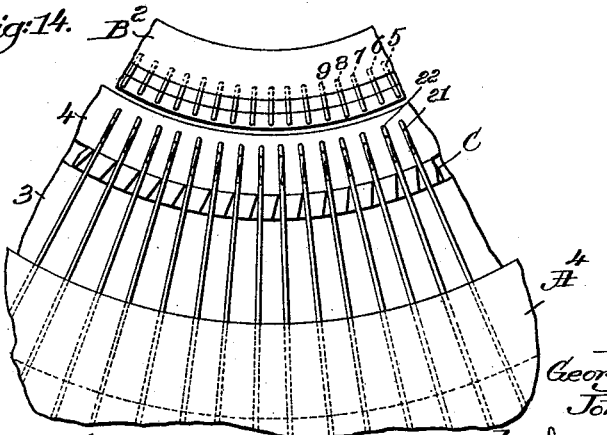

Figure 1 is a top or plan view of a knitting-machine containing the improvements to be herein claimed. Fig. 2 is a section of Fig. 1 in the dotted line $x$, looking to the right of the same. Fig. 3, in side elevation, shows the cylinder-needle-actuating-cam hub; Fig. 4, an enlarged detail of the dial-needle bed and the dial-needle-racking guide and some of its connected parts instrumental in moving the same. Fig. 5 is a detail showing the head $f^5$ detached. Fig. 6 is an edge view of the bed-plate, the dial-needle bed, and the dial cam-plate and attached devices to control the movement of the dial-needle-racking guide; Fig. 7, an enlarged detail of some of the parts shown in Fig. 6. Fig. 8 is a section on the line $x'$, Fig. 1, enlarged; Figs. 9 and 10, details of the clutch on the shaft; Fig. 11, a detail of the dial cam-plate and its movable throwing-in cam. Fig. 12 is a much-enlarged view of the cam-hub developed. Figs. 13 and 14 show parts of the dial-needle bed, some of the dial-needles, part of the dial-needle-racking guide, and part of the needle-cylinder, and the part of the upright wall of the cylinder-needle-actuating-cam hub, the needles and racking-guide being in different positions.

The bed A, supported on suitable legs or standards (not shown) and having an extension A' to furnish bearings for the main shaft $A^2$, provided with suitable fast and loose pulleys and having a bevel-gear $A^3$, and the dial cam-plate $A^4$, having bevel-teeth $A^{4\times}$, engaged by the gear $A^3$ to rotate said plate, the yoke $A^5$, connected to said plate, its central shaft $A^8$, having the attached collar $A^6$, the ring-like washer B, loose on said shaft, the needle-cylinder B', supported on said washer, the cylinder-needle-actuating-cam hub $B^2$, the fork $B^3$, engaging a rib $a$ on the needle-cylinder to prevent its rotation, the cylinder-needles $a'$, the dial-needles $a^2$, the cylinder-cam $a^3$, and the groove $a^4$, (shown by dotted lines, Fig. 1, in the dial-plate,) and the movable cams or projections $a^5$ $a^6$ in said groove to vary the throw of said dial-needles are and may be all as usual in circular-rib-knitting machines.

Usually the dial-needle bed in which the dial-needles work is made of a single flat circular plate grooved radially for the reception of the needles, but herein the said dial-needle bed is composed of two ring-like pieces 3 and 4, which are bolted together, and the part 3 is connected with the frame-bed A, as best shown in Figs. 2, 13, and 14, the central part being grooved for the reception of the needles, the parts 3 and 4 being so shaped and attached as to leave a circular space in which are placed the segmental racking-guides C, one or more, each guide having fastened to its under side, as shown in Figs. 1, 4, and 6, a stud $c$, which is extended down through a slot in the part 4 of the dial-needle bed, said stud, shown as screw-threaded at its lower end, being embraced loosely by a block $c'$, sustained in place by means of a suitable nut $c^2$, said blocks $c'$, just alike, having connected to them a suitable link, as $c^3$ $c^4$, attached, respectively, to levers $c^5$ $c^6$, having, as shown, a common fulcrum $c^7$, each lever having a roller or other stud, said stud entering one of two grooves $c^8$ $c^9$ in the periphery of a cam-hub $c^{10}$, fast on a shaft $d$, having loosely mounted on it a worm-toothed gear $d'$, having its sleeve inserted in a bearing made in the extension $A'$, said gear $d'$ being engaged and rotated by a worm $d^3$, carried by a sleeve $d^4$, fast on the continuously-rotated driving-shaft $A^2$.

The worm-toothed gear $d'$ forms part of a clutch $d^5$ $d^6$, the second part $d^6$ of the clutch being extended laterally from one end of a sleeve $d^7$, feather-keyed on the shaft $d$ (see Fig. 8) and acted upon by a spring $d^8$, which normally acts to put the clutch part $d^6$ into engagement with the clutch part $d^5$, the said parts being kept from engagement during regular knitting by reason of a stud or projection $d^{10}$ on the sleeve $d^7$, which rests against a holder $d^{12}$, (see Figs. 1 and 7,) pivoted at $d^{13}$, Fig. 6, and provided with a pin $d^{14}$, which is acted upon by the high links $e^2$ of the pattern-chain $e$, it hanging on a chain-carrying barrel fast on a shaft $m^3$, provided at one end with a ratchet-wheel $m^2$, said ratchet-wheel being acted upon by a pawl $m'$, mounted on an eccentric $m$, fast on one end of the sleeve of the worm-wheel $d'$, so that said sleeve, it being moved continuously by the worm $d^3$ on the main shaft $A^2$, at all times keeps the shaft $m^3$ moving intermittingly. The high links act to lift the holder $d^{12}$, that it may release the projection $d^{10}$ and let the clutch parts $d^5$ $d^6$ come together to let the worm-wheel start the shaft $d$ and cam $c^{10}$ whenever the racking is to take place. To hold the shaft $d$ fixed when the clutch parts $d^5$ $d^6$ are disengaged and not being positively rotated, we have applied to one end of the shaft a split arm $n$, which is clamped frictionally about the shaft by a screw $n'$, said arm being best shown in Fig. 6.

Fig. 14 shows part of the dial-needle bed, dial cam-plate, the top of the cylinder-needle cam grooved for the cylinder-needles, and the cylinder-needle bed with some of the dial-needles, the parts being in the position for regular knitting, and in the said figure the needle 21, if pushed forward, will enter the space between the grooves 5 and 6 for the cylinder-needles; but when the racking-guide C is moved to rack the needles they will be moved, as in Fig. 13, so that the needle 21 will pass to the right of the groove 5 and the needle 22 will enter the space between the grooves 5 and 6. This change of position of the dial-needles, causing them to enter between different cylinder-needles from those with which they coöperate in regular knitting, makes a change of stitch, and the stitch is designated as a "racked" stitch. As the sleeve $d^7$ revolves the pin $d^{10}$ passes under the holder $d^{12}$ so long as it is held up by a link $e^2$ of the chain, but when a low link comes under the pin $d^{14}$ then the holder drops by gravity and the pin $d^{10}$ in its rotation meets the beveled front end of the holder and effects the disengagement of the clutch.

One garment being knitted, to form a finish for the next garment a separating course is made by casting the stitches from the dial-needles, and to do this the dial-needles have given to them an inward motion by a movable throwing-in cam, to be described, to enable all of the loops held on their shanks to be brought behind the latches. To effect this, a link just at the rear of the series of high links used for racking is provided at its side with a pin, as 24, which acts on an arm $f$, fast on a rock-shaft $f'$, said rock-shaft having a second arm $f^2$, which by a link $f^3$ is attached to one end of a pivoted lever $f^4$, mounted on a bracket depending from the under side of the bed A. The lever $f^4$ is provided with a pivoted cam-shaped head $f^5$, having at its inner side near its outer end a laterally-extended toe $f^6$, which may rest on the end of said lever $f^4$. When the said lever is turned to lift the head, the latter strikes the lower end of a rod $g$, provided at its upper end with a cam-plate $g'$, thus putting said cam-plate temporarily into operative position. When the cam-plate $g'$ is lifted, as described, it is in position to be struck by the outer end 25 of a lever $g^2$, said lever in its inward movement carrying with it a cam $g^3$, pivoted to the dial-needle plate at $g^4$, causing said plate in its new position to act on the butts of the dial-needles and move them inwardly far enough for their latches to pass through the loops on their shanks, so that the said needles when drawn back are enabled to cast off the work previously held on them. The movement of the lever $g^2$ to put the cam $g^3$ into its extreme working position described also acts to push outwardly a stop $h$, so that said stop immediately meets the catch $h'$, which acted temporarily to engage a notch in and hold up the rod $g$, letting said rod and cam $g'$ immediately drop. When the lever $g^2$ is pushed in, as described, it should be held in for one rotation of the dial-plate, and to do this this machine has been provided with a latch $h^4$, pivoted on the said dial cam-plate at $h^5$, a suitable spring $h^6$ acting to keep the said latch in place. The latch at its opposite end has a heel $h^7$, which in the rotation of the dial cam-plate meets the top of an inclined lug $h^8$, which immediately effects the release the lever $g^2$, letting the spring $h^9$ draw it back into its normal position. The interior of the needle-cylinder is cut to leave a shoulder $n^2$, which rests on or close to the shoulder $n^3$ of the cylinder-needle cam, and the part of the cylinder above said shoulder, as well as that below it, is grooved for the reception of said cylinder-needles, some of which are shown in Fig. 2. The head $f^5$ is pulled upon by a spring 30, so that when the lever $f^4$ has been moved, as described, to lift the rod $g$ and the said lever resumes its normal position the head $f^5$ as it strikes the said rod on its return movement may yield. The bolt $A^{13}$ on the yoke $A^5$ enters a link $A^{14}$, which is pivoted to an arm $A^{15}$, projecting from the shaft of the cylinder-needle-cam hub, so that said hub and the dial-plate may revolve in unison, all as common.

Having fully described our invention, what we claim, and desire to secure by Letters Patent, is—

1. A knitting-machine containing the following instrumentalities, viz: a cylinder-needle bed to contain cylinder-needles, a cylinder-needle cam, a dial-needle bed, to contain a series of dial-needles, a dial cam-plate, dial-needle-racking guides, two levers, means to connect said levers with said racking-guides, two cams one to actuate each of said levers, a pattern-surface, and actuating means controlled by said pattern-surface to operate said cams and move the racking-guides at the desired times, substantially as described.

2. A knitting-machine containing the following instrumentalities, viz: a cylinder-needle bed to contain cylinder-needles, a cylinder-needle cam, a dial-needle bed, to contain a series of dial-needles, a dial cam-plate, a plurality of segmental racking-guides placed end to end, and means to move the same in the arc of a circle independently of the said dial-needle bed, to rack the dial-needles, substantially as described.

3. A knitting-machine containing the following instrumentalities, viz: a cylinder-needle bed to contain cylinder-needles, a cylinder-needle cam, a dial-needle bed, to contain a series of dial-needles, a dial cam-plate, a plurality of segmental racking-guides, a pattern-surface, means intermediate said pattern-surface, and said segmental racking-guides to automatically actuate the same in the arc of a circle independently of said dial-needle bed, substantially as described.

4. A knitting-machine containing the following instrumentalities, viz: a cylinder-needle bed to contain cylinder-needles, a cylinder-needle cam, a dial-needle bed, to contain a series of dial-needles, a dial cam-plate provided with knitting-cams, a racking-guide, means to move the same in the arc of a circle independently of the said dial-needle bed, to rack the dial-needles, a cam, as $g^3$, to move the dial-needles inwardly, and means to automatically change the position of said cam $g^3$ to impart an inward movement to said dial-needles when racking-stitches are to be made, to thus enable the work to be cast off said dial-needles, substantially as described.

5. The dial-needle bed to contain dial-needles, the bed A sustaining said needle-bed, a dial cam-plate having a cam $g^3$, a lever $g^2$ connected with said cam, a rod extended below said bed A and provided at its upper end with a cam-plate, and a pattern-surface, combined with a lever, actuated by said pattern-surface, and with means between said lever and said rod to raise said rod and cam, substantially as described.

6. The dial-needle bed to contain dial-needles, the bed-plate sustaining said needle-bed, a dial cam-plate having a movable cam and lever $g^2$, a rod extended below said bed-plate and provided at its upper end with a cam-plate to engage and actuate said lever, and a pattern-surface, combined with a lever having a pivoted spring-controlled head, and means between it and said pattern-surface to move said lever and cause its spring-head to raise said rod and cam, substantially as described.

7. The dial-needle bed to contain dial-needles, a bed-plate, a vertically-movable cam-plate, means under the control of a pattern-surface to lift said vertically-movable cam-plate, a latch to hold said cam-plate in its elevated position, a dial cam-plate, and a throwing-in cam carried thereby, combined with a lever mounted on said dial cam-plate and having at one end a connected stop, the said lever being actuated by the vertically-movable cam-plate, and said stop thereafter turning said latch to release and permit the said vertically-movable cam-plate to descend, substantially as described.

8. In a knitting-machine, a plurality of segmental racking-guides, the shaft $d$, having the fixed cam-hub, devices intermediate said hub and said racking-guides, the feather-splined clutch part having a pin or projection $d^{10}$ at its outer side and a projection $d^6$ at its end, the loose sleeve provided with a projection $d^5$, and means to rotate said sleeve, combined with a holder to act against said pin or projection to disconnect the said clutch part from the said sleeve, and a pattern-surface to raise and lower said holder, the latter when raised permitting the said clutch part to engage the said sleeve and start the rotation of the said shaft, substantially as described.

9. The dial-needle bed to contain dial-needles, the bed A sustaining said needle-bed, a dial cam-plate having a cam $g^3$, a lever $g^2$ connected with said cam, a rod extended below said bed A and provided at its upper end with a cam-plate, and a pattern-surface, combined with a lever, actuated by said pattern-surface, and with means between said lever and said rod to raise said rod and cam, and with a stop $h$ and a catch $h'$ to operate, substantially as described.

In testimony whereof we have signed our names to this specification in the presence of two subscribing witnesses.

GEORGE A. LEIGHTON.
JOHN H. RICE.

Witnesses:
DAVID A. TAGGART,
HARRY E. LOVEREN.